Dec. 15, 1931.  A. E. HUTT  1,836,029
PNEUMATIC CONTROLLER
Filed Feb. 21, 1931
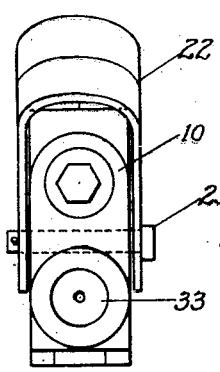
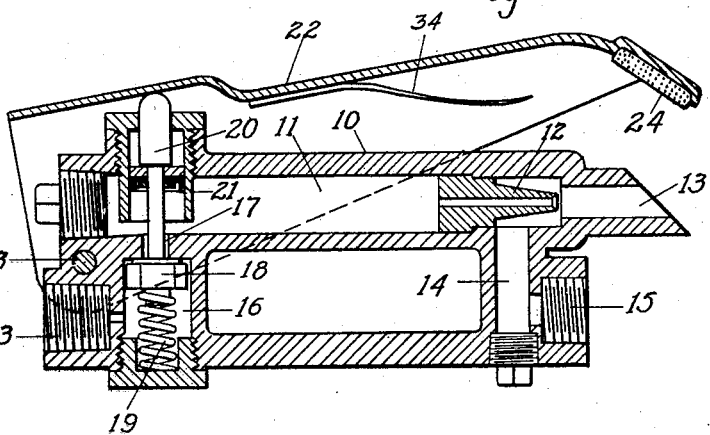
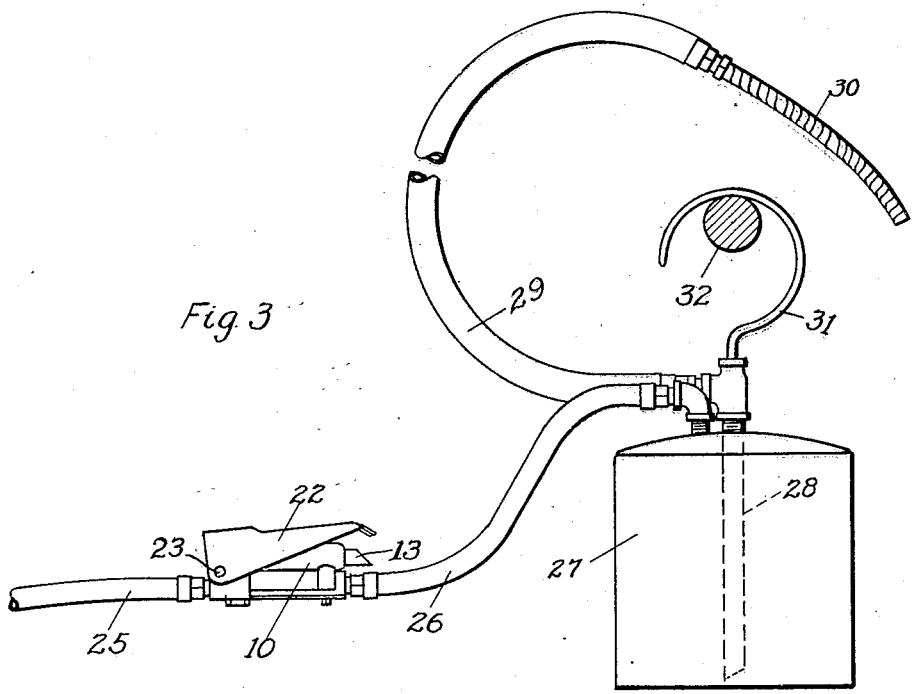
Inventor
Albert E. Hutt
by his attorney
Farnum F. Dorsey Patented Dec. 15, 1931

1,836,029

UNITED STATES PATENT OFFICE

ALBERT E. HUTT, OF NEW ROCHELLE, NEW YORK, ASSIGNOR, BY MESNE ASSIGNMENTS, TO VACUUM OIL COMPANY, INC., OF NEW YORK, N. Y., A CORPORATION OF NEW YORK

PNEUMATIC CONTROLLER

Application filed February 21, 1931. Serial No. 517,402.

This invention relates to a device of the kind in which the flow of compressed air through an aspirator is so controlled as to produce, alternatively, either sub-atmospheric or super-atmospheric pressure, at the will of the operator, in a receptacle with which the aspirator is connected.

The object of the invention is to produce a device, of the kind in question, which is simple, inexpensive and compact, and which may be grasped conveniently in the hand of the user and controlled in a convenient manner.

To the foregoing end, the invention resides in a construction and arrangement involving various features hereinafter described, and particularly, a single manually operable member which controls both the inlet and the outlet of the aspirator.

In the accompanying drawings, Fig. 1 is a sectional side elevation of a pneumatic controller embodying the present invention, Fig. 2 is an end elevation of the same, and Fig. 3 is a side elevation of a flushing outfit illustrating one way in which the controller may be used.

The invention is illustrated as embodied in a controller comprising a body 10 of a size and shape convenient for grasping in the hand. A longitudinal bore 11 in the body contains, near its forward end, an ejector nozzle 12 which discharges into a draft-passage 13 constituting the outlet of the ejector. When the ejector is acting as such it creates suction in a transverse bore 14 which communicates with a vent 15 adapted to receive a hose coupling.

At the rear end of the body 10 is a valve chamber 16 communicating, through a passage 17, with the bore 11. The passage 17 is controlled by a valve 18 which is normally seated both by air-pressure and by a spring 19. The valve is engaged by a plunger 20 which slides in a guide 21 and projects at the top of the body. A sheet-metal lever, of U-shape in cross section, is pivoted at 23 to the rear end of the body, and it bears against the plunger 20 so that if the lever be swung downwardly the air valve 18 is moved from its seat.

The extremity of the draft passage 13 is bevelled, and the lever 22 carries, at its forward end, a disc 24 of some yielding material, such as soft leather, which may be pressed against the bevelled surface of the outlet, to act as a valve or closure, when the lever is sufficiently depressed.

The valve chamber 16 communicates with an inlet opening 33 which is threaded to receive a hose coupling.

The controller is particularly designed for use in apparatus for forcing oil into and drawing it out of the gear housings of a motor vehicle. As so used a hose 25, supplied with compressed air, is attached to the inlet 33, and a second hose 26 connects the vent 15 with the top of an oil container 27. A pipe 28, extending to the bottom of the container 27, is connected with a third hose 29 which has a flexible metal terminal 30 adapted for insertion into the filling opening of a gear housing. The receptacle is provided with a hook 31 by which it may be suspended on an axle 32 or other part of the vehicle.

In an arrangement such as that of Fig. 3, the terminal 30 may be introduced into a gear housing, and the user then grasps the controller and, by pressure of the hand, depresses the lever 22 enough to open the air valve 18. Compressed air then flows to the nozzle 12, and the aspirator creates a suction, through the hose 26 and the oil receptacle, by which spent oil in the gear housing is drawn, through the hose 29, into the receptacle.

The operator then withdraws the terminal 30, and presses the lever 22 fully down, thus causing the disc 24 to close the outlet 13. Compressed air then passes, from the nozzle 12, through the passage 14 and the hose 26, thus creating pressure in the oil receptacle and discharging the oil through the hose 29.

By similar manipulations, the receptacle may be filled with flushing oil, which may be discharged into and withdrawn from the gear housing, and fresh lubricating oil may be supplied to the gear housing.

When the lever 22 is partly depressed, to permit the aspirator to act, it is important that the outlet 13 shall not be obstructed in any degree. To assist the user in depressing the lever to the proper position, but not too far, a spring 34 is welded to the inside of the lever, in position to engage the body, and resist further movement, when the lever has been depressed sufficiently to open the air valve. When full movement of the lever is required, the added resistance of this spring may be easily overcome.

The invention claimed is:

1. A pneumatic controller comprising an aspirator, an admission valve for controlling the admission of air to the aspirator, a discharge valve for controlling the discharge of air from the aspirator, and a manually-operable member controlling said valves and arranged to act, by continuous movement in one direction, first to open the admission valve and thereafter to close the discharge valve.

2. A pneumatic controller comprising an elongated body which may be held in the hand, an aspirator, within the body, having a discharge vent at the forward end of the body, an admission valve, within the body, for controlling the admission of air to the aspirator, a lever arranged generally parallel with the body and pivoted thereto near the rear ends of the lever and the body, the lever being connected with the admission valve so as to open the valve when the lever is depressed, and means, at the forward end of the lever, for engaging and closing said discharge vent when the lever is fully depressed.

3. A pneumatic controller comprising a body provided with a lengthwise passage opening at one end of the body to provide a discharge vent, an aspirator nozzle, within said passage, directed towards said discharge vent, an air valve slidable within the body, in a direction transverse to said passage, for controlling the admission of air to the passage, a lever pivoted to the body and cooperating with said valve to open the valve when the lever is swung about its pivot, and means, controlled by the lever, for closing said discharge vent in consequence of movement of the lever.

4. A pneumatic controller comprising an aspirator, an admission valve for controlling the admission of air to the aspirator, a discharge valve for controlling the discharge of air from the aspirator, a manually-operable member controlling said valves and arranged to act, by continuous movement in one direction, first to open the admission valve and thereafter to close the discharge valve, and yielding means tending to arrest the manually-operable member in a position intermediate between the opening of the admission valve and the closing of the discharge valve.

ALBERT E. HUTT.